No. 740,697. Patented October 6, 1903.

UNITED STATES PATENT OFFICE.

ROBERT SCANNELL, OF CLEVELAND, OHIO.

COMPOSITION OF MATTER FOR USE IN POLISHING GOLD, SILVER, BRASS, OR OTHER METALS.

SPECIFICATION forming part of Letters Patent No. 740,697, dated October 6, 1903.

Application filed January 20, 1903. Serial No. 139,804. (Specimens.)

*To all whom it may concern:*

Be it known that I, ROBERT SCANNELL, a citizen of the United States, residing at Cleveland, in the county of Cuyahoga and State of Ohio, have invented a certain new and useful Composition of Matter to be Used for Polishing Gold, Silver, Brass, or other Metals, of which the following is a specification.

My compound consists of the following ingredients combined in the proportions stated, viz: tripoli, two and one-half pounds; oxalic acid, one and one-half ounces; common salt, one pound; carmine, one-quarter ounce; water, about eight or ten ounces.

The tripoli, oxalic acid, salt, and carmine are thoroughly mixed or ground together, after which the water is added in a sufficient quantity to make a thick paste or liquid.

In using this polish the same is applied to metal by means of a cloth, and after rubbing the surface upon which it is so applied a clean polishing-cloth or chamois may be employed to wipe the residue of the polish therefrom.

What I claim, and desire to secure by Letters Patent of the United States, is—

1. The herein-described composition of matter, consisting of tripoli, oxalic acid, common salt, carmine and water, substantially as described and for the purpose specified.

2. The herein-described composition of matter for polishing metals, consisting of two and one-half pounds of tripoli, one and one-half ounces of oxalic acid, one pound of common salt, one-quarter ounce of carmine and eight or ten ounces of water, substantially as described.

In testimony whereof I have signed my name to this specification in the presence of two subscribing witnesses.

ROBERT SCANNELL.

Witnesses:
WALTER L. NASON,
LETTIE L. BAKER.